(12) United States Patent
Provost

(10) Patent No.: US 6,363,583 B1
(45) Date of Patent: Apr. 2, 2002

(54) FENCE-TIGHTENING DEVICE AND METHOD

(76) Inventor: Dom Gregory Provost, 4264 Hwy. 99 South, Ashland, OR (US) 97520

(*) Notice: Subject to any disclaimer, the term of this patent is extended or adjusted under 35 U.S.C. 154(b) by 0 days.

(21) Appl. No.: 09/478,132

(22) Filed: Jan. 5, 2000

(51) Int. Cl.⁷ .......................... A44B 21/00; B21F 27/00; B65H 75/00
(52) U.S. Cl. ....................... 24/71.1; 24/909; 242/388.2; 256/41
(58) Field of Search ................... 24/71.1, 909; 256/40, 256/41; 140/123.5; 242/388.2

(56) References Cited

U.S. PATENT DOCUMENTS

| | | | |
|---|---|---|---|
| 75,759 A | * 3/1868 | Hewett, Jr. | ................. 24/712.1 |
| RE11,201 E | * 11/1891 | Flattau | ......................... 24/71.1 |
| 607,431 A | 7/1898 | Gasper | |
| 1,643,502 A | * 9/1927 | King | .......................... 24/71.1 |
| 2,451,389 A | * 10/1948 | Howe | ........................... 256/40 |
| 2,879,808 A | 3/1959 | Mallory | |
| 3,620,263 A | 11/1971 | Vargas Beltran | |
| 3,704,858 A | 12/1972 | Hutton et al. | |
| 3,806,992 A | * 4/1974 | Reimer | ........................ 24/71.1 |
| 3,831,642 A | 8/1974 | Greeott | |
| 4,041,992 A | 8/1977 | Lynn | |
| 4,057,221 A | 11/1977 | Leath | |
| 4,298,185 A | 11/1981 | Janssen | |
| 4,365,436 A | * 12/1982 | Ritchey | ........................ 40/615 |
| 4,634,100 A | 1/1987 | Glen | |
| 4,700,434 A | 10/1987 | Fambrough | |
| 5,109,577 A | * 5/1992 | Youing | ......................... 24/71.1 |
| 5,170,536 A | 12/1992 | McBroom | |
| 5,255,866 A | * 10/1993 | Campolo | .................... 242/85.1 |
| 5,655,267 A | 8/1997 | Schwartz | |

\* cited by examiner

*Primary Examiner*—Victor N. Sakran
(74) *Attorney, Agent, or Firm*—Kolisch, Hartwell, Dickinson, McCormack & Heuser, P.C.

(57) ABSTRACT

A tool for tightening a plurality of wire lengths that extend between a first bracing location on a first fence support and a second bracing location on a second fence support, the wire lengths defining an axis extending generally parallel to their lengths. The tool includes a body adapted to be transversely inserted between the wire lengths so that the wire lengths pass around the body. The body has at least one seating portion formed on its outer surface for retaining at least one of the wire lengths generally between the ends of the body when the body is inserted between the wire lengths. The body is adapted so that, when inserted between the wire lengths, the body can be selectively rotated about the axis to twist the wire lengths around one another and thereby exert a contracting force on the fence supports.

13 Claims, 4 Drawing Sheets

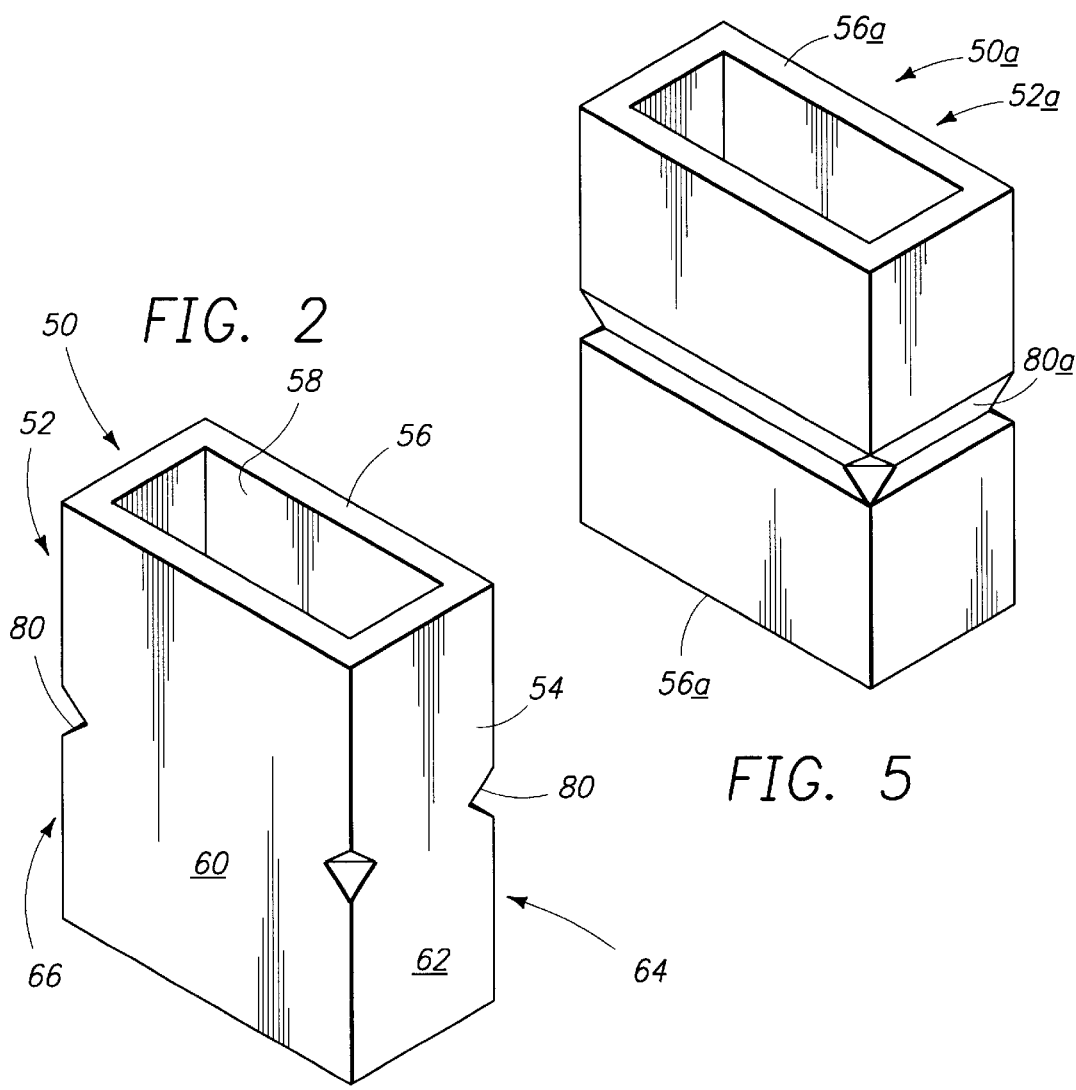
FIG. 2
FIG. 5
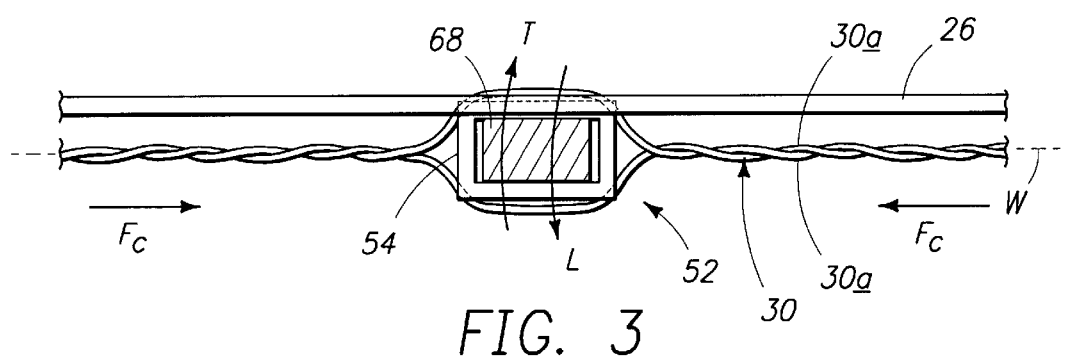
FIG. 3

FENCE-TIGHTENING DEVICE AND METHOD

TECHNICAL FIELD

The invention relates generally to fencing structures, and more particularly to a device and method for tightening a plurality of wire lengths extending between bracing locations on a length of fencing.

BACKGROUND OF THE INVENTION

Fences of varying types are widely used for a variety of purposes, such as marking property boundaries, containing livestock and preventing trespass. Commonly, a length of fencing will include a number of supports and a fence boundary material supported by and stretched between the supports. The supports typically are rigid posts that are vertically oriented and secured to holes in the ground. The fence boundary material is generally lightweight and flexible, and, depending on the application, may be formed from a variety of materials, including spaced-apart strands of wire, wire mesh, barbed wire, chicken wire, or plastic sheeting.

It is generally desirable to reinforce fence supports in order to increase the strength and stability of a length of fencing, especially at corners or terminal extents of the fencing. Where vertical posts are employed, this may be accomplished by spacing a pair of vertical posts with a pair of wire braces, also referred to as cross-post braces, extending therebetween. Typically, a first wire brace is secured between the top of one of the posts and the bottom of the other post, and a second brace is secured between the bottom of the first post and the top of the second post. The wire braces are tightened to exert a contracting force on the posts. This strengthens and increases the stability of the length of fencing. Often, a rigid cross-post spacer also extends between the posts to provide additional support and stability.

One type of wire brace is formed from plural lengths of wire extending between adjacent posts. This type of brace may be tightened by inserting an elongate lever between the wire lengths in order to twist the wire lengths around one another. The lever is inserted between the wire lengths so that it is generally perpendicular to the wire lengths, with the wire lengths passing around the lever. The lever is then rotated about the length of the wire lengths to twist the wire lengths around each other until a desired tension is achieved. The lever must be long enough to provide sufficient leverage to twist the wire lengths around one another and overcome the tendency of the wire lengths to untwist, which increases as the wire lengths are tightened.

Though this tightening method is effective, the relative positions of the wire braces and fence boundary material in a typical length of fencing pose significant limitations on the method. Specifically, the wire braces are parallel to, and normally within a few inches of, the plane that generally contains the fence boundary material. As a result, the fence boundary material limits the rotation of any tightening lever long enough to provide the necessary leverage for twisting the wire lengths of a wire brace. Such a lever can only be rotated a half revolution at most before being blocked from further rotation by the fence boundary material. Furthermore, the wire lengths bind around the lever once a certain tension is reached, such that the lever cannot be removed from or slid between the wire lengths to avoid the blocking of the lever.

This limitation on the rotation of a lever requires that the wire braces be fully tensioned before the fence boundary material is put in place, making initial installation of a length of fencing less convenient. In addition, after initial installation of the fence, the boundary material must be removed to install and tighten a new wire brace, or to re-tension an existing brace. For example, the wire lengths of a wire brace may become worn over time and snap, necessitating installation and tensioning of a new wire brace. Also, wire lengths may loosen due to stretching, wear occurring between the wire lengths and the tightening lever or support posts, or shifting of the support posts. These situations are fairly common, and require removal of the fence boundary material in order to tension a newly installed wire brace or re-tension an existing wire brace. As a result, a considerable amount of time and effort is required to replace or re-tension an existing brace.

SUMMARY OF THE INVENTION

The present invention provides a device and method for tightening cross-post braces formed by plural lengths of wire. The device includes a body having an outer surface and generally opposed ends. The body is adapted to be inserted between the wire lengths so that the wire lengths pass around the outer surface of the body, and so that the body extends between its opposed ends in a direction generally transverse to an axis defined by the wire lengths. Rotation of the body about the axis twists the wire lengths around one another so that the wire lengths exert a contracting force. The device includes at least one seating portion formed on the outer surface of the body to retain the wire lengths generally between the opposed ends of the body.

Additionally, a passage may be provided through the body, with the passage being adapted to removably receive a lever for facilitating rotation of the body about the axis. The passage is adapted so that a lever may be slid through, or removed from, the passage in order to alleviate blocking of the lever by fence boundary material adjacent to the wire lengths. This allows the tension of the wire lengths to be adjusted while the fence boundary material is in place.

BRIEF DESCRIPTION OF THE DRAWINGS

FIG. 2 is an isometric view of a tightening tool constructed according to the present invention.

FIG. 3 is an enlarged partial sectional view taken along line 3 of FIG. 1 and showing a wire brace tightened with the tightening tool of FIG. 2.

FIG. 5 is an isometric view of another embodiment of a tightening tool constructed according to the present invention.

DETAILED DESCRIPTION OF THE INVENTION

Figure 1:
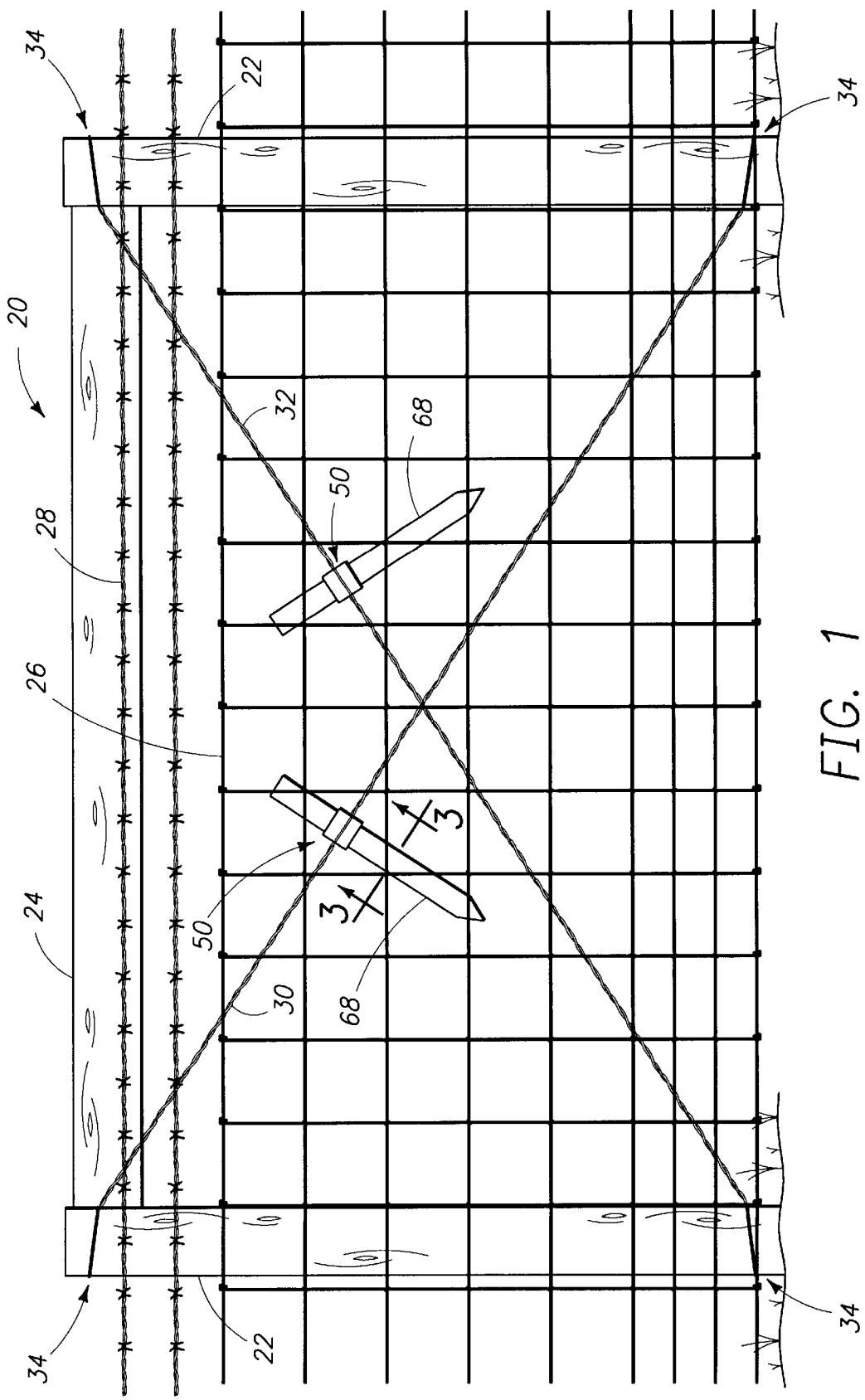
FIG. 1 is a front view of a length of fencing including cross-braced wire braces tightened using the device and method of the present invention.

FIG. 1 depicts a length of fencing 20 including vertical posts 22 secured within holes in the ground, a rigid cross-post 24 spacing the vertical posts, and fence boundary material such as wire mesh 26 and barbed wire 28. Length of fencing 20 may be used in farming, ranching and other applications for a variety of purposes, including marking property boundaries, containing livestock, and preventing trespass. Posts 22 and cross-post 24 are typically made of wood or metal, although other materials may be used. The fence boundary material may be formed from any suitable boundary material, such as separate strands of wire, wire mesh, chicken wire, barbed wire, sheeting made of plastic or other materials, or from a combination of these types of boundary materials.

Also shown in FIG. 1 are a pair of tightened wire braces 30 and 32. Wire braces 30 and 32 extend between bracing locations 34 included near the ends of posts 22, and may be selectively tightened to exert a contracting force on the posts in order to reinforce the fencing. Wire braces 30 and 32 may be formed from a loop of wire passed around posts 22, as depicted in FIG. 1, from a long length of wire wrapped around the posts, or from a plurality of separate wire lengths. However formed, wire braces 30 and 32 each include a plurality of wire lengths that each extend between bracing locations 34. The depicted wire braces each have two wire lengths that extend between posts 22, although it is within the scope of the invention that the braces may include additional lengths. Though shown in a cross-brace configuration, wire braces may be employed in varying numbers and in a variety of orientations to reinforce a length of fencing.

Figure 4:
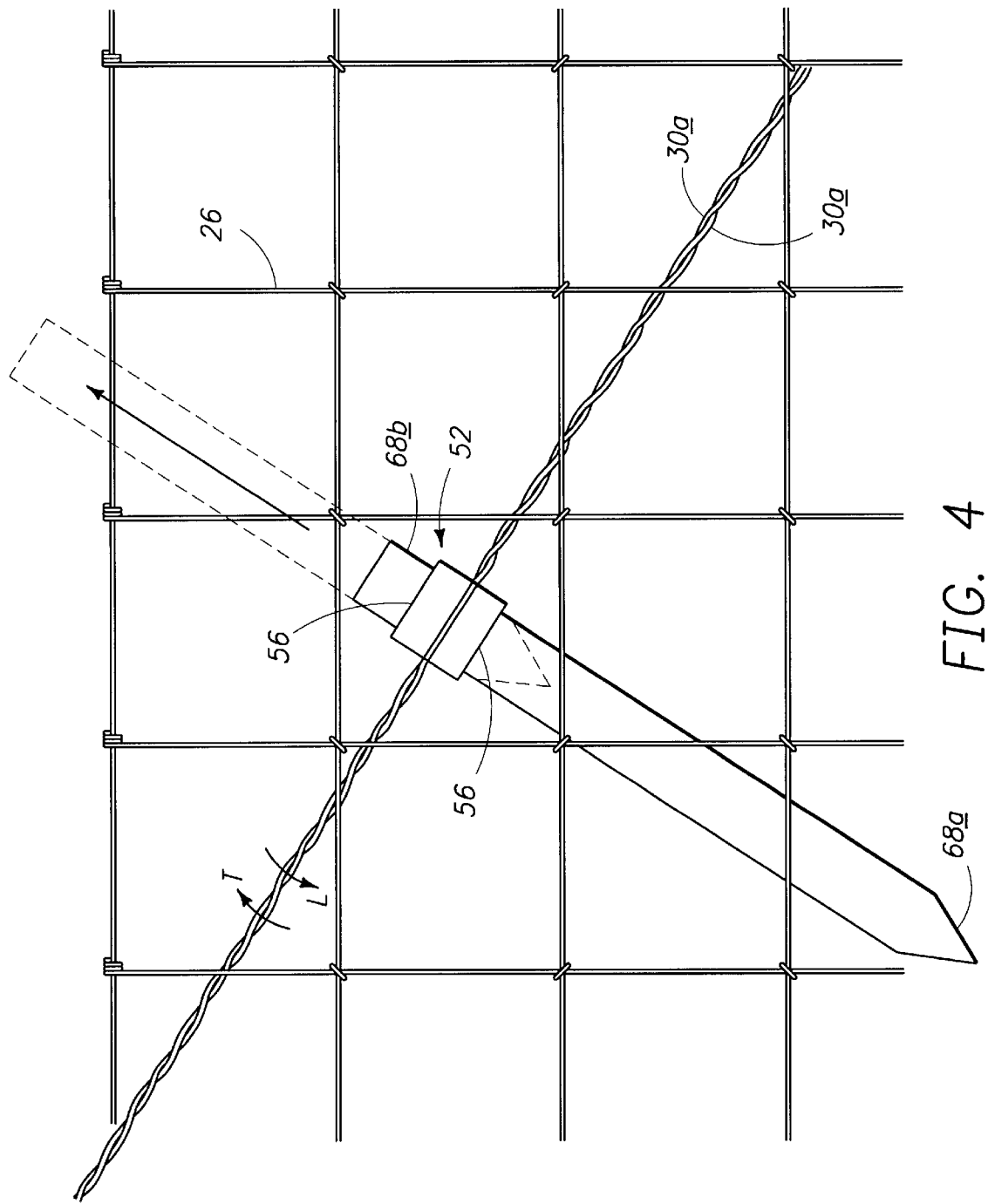
FIG. 4 is an expanded, partial front view taken from FIG. 1 and showing the method of using the tightening tool depicted in FIG. 2.

FIG. 2 depicts an embodiment of a tool 50 constructed according to the present invention that allows wire braces to easily be tightened and loosened without having to remove fence boundary material such as wire mesh 26. FIGS. 3 and 4 depict tool 50 inserted between wire lengths 30a of wire brace 30 to adjust the tension of the wire brace.

Tool 50 includes a body 52, an outer surface 54, and generally opposed ends 56. As shown, the body is generally rectangular, having four sides 60, 62, 64 and 66. As shown in FIGS. 3 and 4, the body is adapted to be inserted between wire lengths 30a of wire brace 30, so that the wire lengths pass around the outer surface of the body, and so that the body extends between its opposed ends 56 in a direction generally transverse to axis W. Axis W is defined to extend generally parallel to wire lengths 30a. When body 52 is inserted between wire lengths 30a, the body may be rotated about axis W to tighten or loosen wire brace 30. Selective rotation of body 52 in direction T twists wire lengths 30a around one another so that wire brace 30 tightens and exerts a contracting force Fc along its length. Similarly, body 52 may be rotated in direction L to untwist wire lengths 30a and thereby loosen the wire brace.

Tool 50 may, but does not necessarily, include a lever receiver, such as passage 58 defined through tool body 52, for removably receiving a lever, such as stake 68. Stake 68 may be used to rotate tool 50, or to brace against wire mesh 26 to maintain the tension in wire brace 30 by preventing the tool from rotating. Passage 58 is adapted so that, when tool 50 is inserted between wire lengths 30a, stake 68 can be slid through passage 58 to easily remove the stake or adjust the relative position of the stake and tool.

Because stake 68 can be slid through passage 58 to remove the stake or adjust its position relative to the tool, tool 50 and stake 68 can be used to adjust the tension of wire brace 30 without having to remove wire mesh 26. In FIG. 4, stake 68 has been rotated in direction T such that end 68a, is blocked by wire mesh 26. In this state, stake 68 cannot be rotated further in direction T to twist wire lengths 30a and further tighten wire brace 30. However, stake 68 can be slid as indicated into the position shown in dashed lines so that end 68a, is no longer obstructed by wire mesh 26, allowing the stake to be further rotated in direction T to further tighten wire brace 30. This process of rotating stake 68 one-half revolution about axis W and then sliding the stake through passage 58 may be repeated until the desired tension is achieved.

Alternatively, stake 68 can be slid through passage 58 in a direction opposite to that indicated by the arrow in FIG. 4 so that stake end 68b extends only partway through a first end of the passage, leaving room for a second stake to be inserted into the other open end. The first stake is then removed, and the second stake is used to further rotate the body and tighten the wire brace. As a further alternative, pliers or some other tool can be used to hold body 52 or otherwise prevent the wire lengths 30a from untwisting while stake 68 is removed from passage 58 and reinserted to further rotate body 52. All of these methods allow the tension of a wire brace to be easily adjusted, while avoiding the time and inconvenience of removing wire mesh 26.

Stake 68 can also be positioned within passage 58 to prevent wire lengths 30a from untwisting. Once a desired tension is achieved, stake 68 can be slid through passage 58 so that wire mesh 26 obstructs either of stake ends 68a, or 68b of the stake. This prevents stake 68 and tool 50 from rotating about axis W, in order to maintain wire lengths 30a in a twisted state to preserve the tension in wire brace 30.

As seen in FIG. 2, tool 50 preferably includes a seating portion or portions, such as notches 80, formed on outer surface 54 of body 52. Notches 80 are but one example of the invented seating portions, which may be formed anywhere on the outer surface of the body, and which are adapted to retain wire lengths 30 generally between opposed ends 56. The retention may be accomplished by retaining as few as one, and as many as all, of the wire lengths of the wire brace between the opposed ends.

More specifically, notches 80 extend inwardly from outer surface 54 and are formed at the corners of outer surface 54 where sides 60, 62, 64 and 66 of body 52 meet. As body 52 is rotated about axis W to twist wire lengths 30a around one another, the wire lengths exert an increasing inwardly-directed force on outer surface 54. This force causes wire lengths 30a to bind around body 52 and seat within notches 80, as shown in FIG. 3. Wire lengths 30a are thus retained between opposed ends 56 of body 52, and the body is prevented from slipping out from between the wire lengths.

Notches 80 may be configured in a variety of ways. As shown, tool 50 includes a notch 80 at each corner, however, having notches at fewer corners, such as at a pair of opposed corners or even at only a single corner are also within the scope of the invention. Notches 80 may be formed midway between opposed ends 56, as shown, or at any other desired location between opposed ends 56. Though depicted in FIG. 2 as triangular, notches 80 may be U-shaped, square, rectangular, polygonal, or have any other desired shape. In addition, the notches may be formed to have any depth and width that body 52 will allow, but are preferably sized to ensure that the wire lengths are securely retained between opposed ends 56.

FIG. 5 provides a further example of a seating portion having a notch-type configuration. FIG. 5 depicts a tightening tool 50a similar to that described before, but having a notch 80a that extends between the corners of body 52a such that the notch extends all the way around outer surface 54a between opposed ends 56a. Alternatively, the notch may extend only between two adjacent corners, such that the notch extends along an entire side, but not all the way around the body. A similar notch may be provided on an opposite side of the body, and/or on one or both of the adjacent sides.

Figure 6:
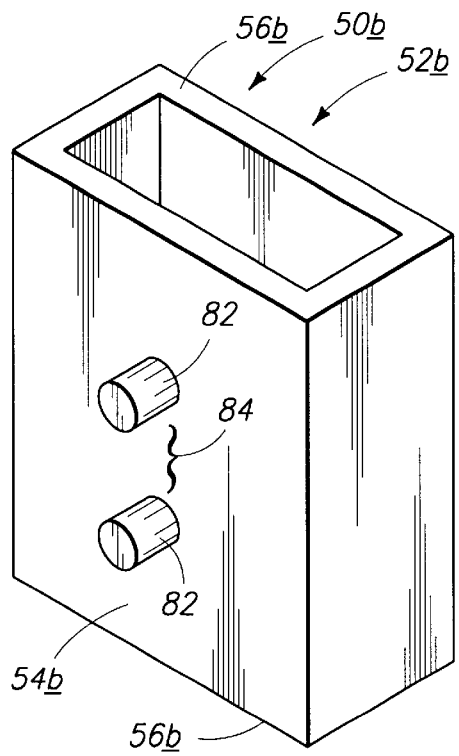
FIG. 6 is an isometric view of another embodiment of a tightening tool constructed according to the present invention.

The seating portion may alternatively be formed to include at least a pair of protrusions or projections that extend from the outer surface of the body to define a wire-receiving region therebetween. For example, FIG. 6 depicts a tightening tool 50b that has a pair of protrusions, such as posts 82, that extend from outer surface 54b to define wire-receiving region 84 extending generally between the posts. When wire lengths are tightened around outer surface 54b of tool body 52b, the wire lengths cinch around the tool so that at least one of the wire lengths is retained by posts 82 in wire-receiving region 84. Posts 82 may be any desired shape or size, and may be positioned anywhere between opposed ends 56b in order to retain wire lengths generally between the opposed ends. Also, an additional pair or pairs of posts may be formed on an opposite side of body 52b, or on any other portion of the body to facilitate retention of wire lengths between the opposed ends.

Figure 7:
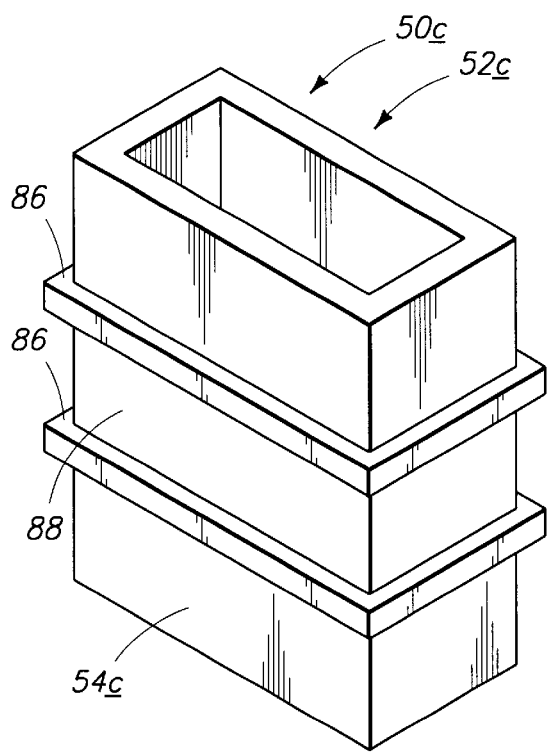
FIG. 7 is an isometric view of another embodiment of a tightening tool constructed according to the present invention.

FIG. 7 depicts another example of a tightening tool having a seating portion formed of a pair of protrusions. Tightening tool 50c includes protrusions such as elongate ribs 86 which project outward from outer surface 54c and extend all the way around body 52c to form a pair of continuous protrusions. Ribs 86 define a wire-receiving region 88 therebetween that similarly extends all the way around the body.

The seating portions depicted in FIGS. 6 and 7 may be thought of as extreme examples of protrusion-type seating portions. Specifically, FIG. 6 shows a single pair of protrusions on one side of the body, while FIG. 7 shows a pair of protrusions extending all the way around the body. Any number of intermediate possibilities exist between these extremes. For example, a pair of elongate ribs may extend only partially around the body, partially or entirely along one side, or on opposing sides of the tool body. On bodies with corners, ribs may be provided to wrap around a corner such that each rib extends partially along both of the sides adjacent the corner. Similarly, the protrusions, in whatever form, may be located anywhere from opposite ends of the tool to a closely spaced configuration near each other, so long as the protrusions define a wire-receiving region therebetween.

Figure 8:
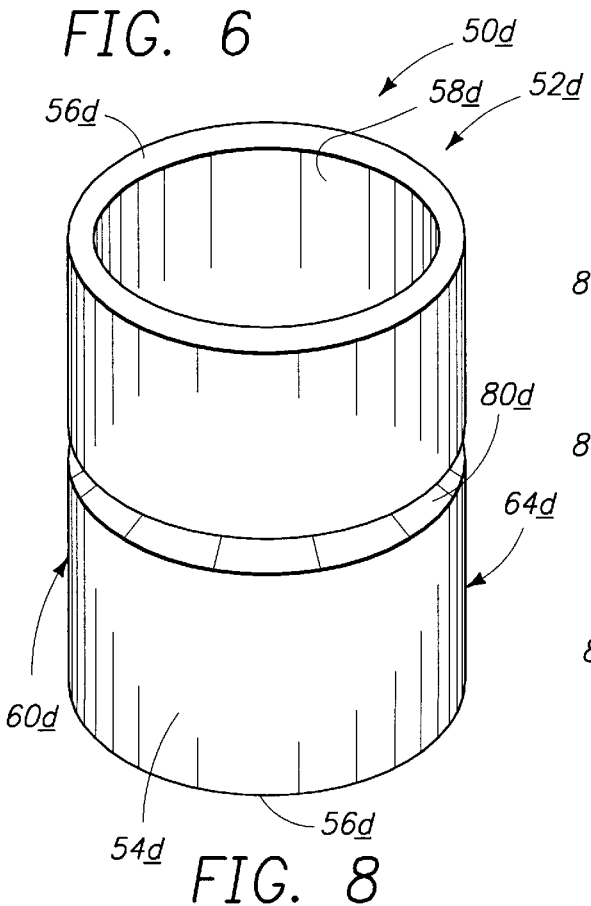
FIG. 8 is an isometric view of another embodiment of a tightening tool constructed according to the present invention.
Figure 9:
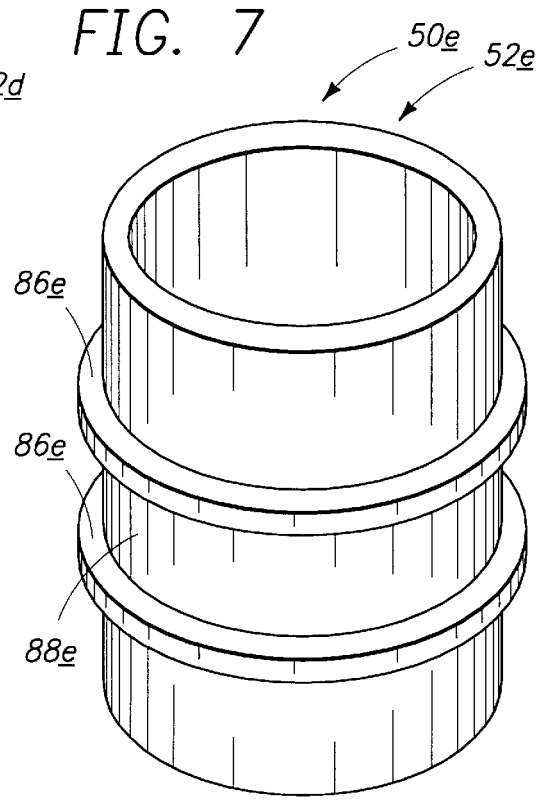
FIG. 9 is an isometric view of another embodiment of a tightening tool constructed according to the present invention.

FIGS. 8 and 9 depict alternate embodiments of the invented tightening tool having cylindrical bodies. Specifically, tightening tool 50d has a cylindrical body 52d with generally opposed sides, or side regions, 60d and 64d, and has a passage 58d defined through the body between opposed ends 56d. Similar to the embodiment of FIG. 5, tightening tool 50d has a seating portion in the form of an elongate notch 80d extending around the outer surface of the tool body. Tightening tool 50e has a similar cylindrical shape, but with a protrusion-type seating portion including a pair of elongate ribs 86e that define a wire-receiving region 88e therebetween. Similar to the embodiment depicted in FIG. 7, the ribs and wire-receiving region extend all the way around the body. As in all the previous examples and embodiments, the seating portions depicted in FIGS. 8 and 9 may be positioned anywhere on the outer surface of the tool body, provided they are adapted to retain wire lengths generally between the opposed ends of the body.

The tightening tool may be made from a variety of materials, and in a variety of shapes. As seen in the depicted embodiments, the tightening tool may be formed to have a generally rectangular or cylindrical body. Alternatively, the body can be square, polygonal, oval, or any other desired shape. Where a passage is provided through the body, the passage may similarly be formed to have a variety of shapes. Typically, the passage is elongate with a generally square or rectangular cross-section, though any shape may be used which permits a lever to be inserted and slid through the passage. In addition, the body may be formed from a variety of materials, including plastic and various metals. Preferably, the selected material is lightweight, rigid and corrosion-resistant in order to meet the demands of an outdoor operating environment. For example, the body may be formed from aluminum.

Although the presently preferred embodiments described above include at least one seating portion, it is within the scope of the present invention that the invented tool may be formed without a seating portion that extends into or from the outer surface of the body. In this embodiment, the braces will seat directly against the outer surface and be retained thereupon by the binding force of the wires as they are cinched around the tool.

The tightening tool may be any size, subject to certain considerations concerning the fencing and wire braces. In particular, the tool body should be long enough to provide a sufficient expanse between the opposed ends of the body so that the body can be used to twist the wire lengths. The body should be at least as long as the diameter of the wire lengths, and typically is several times longer. However, the body should be small enough so that it is not obstructed from rotating by the fence boundary material. Also, where a passage is defined through the body, the body and passage should be sized to accommodate levers large enough to provide the necessary leverage for tensioning the wire braces.

The tightening tool may be formed using a variety of processes, including extruding, molding, stamping, welding, and machining. The seating portions can be formed concurrently with these manufacturing processes, or after the body is formed. For example, aluminum could be extruded in the form of a rectangular tube, with projections being welded to the surface of the tube at a later time to form the seating portions. Alternatively, notches could be stamped or machined into the surface during the extrusion process. As another example, a cylindrical body including a continuous notch extending all the way around the body could be formed in a single-step injection-molding process. Though the invented tightening tool may be manufactured using various methods and materials, and in a variety of shapes and sizes, the tool should be strong enough to withstand the torsional and inward-directed forces exerted by the wire lengths when used as described to tension a wire brace.

In addition, it should be appreciated that the outer surface of the tool body may be colored with any desired color. In fencing applications employing a plurality of tightening tools, it is often desirable that the tightening tools all be the same preselected color or pattern of colors, including reflective colors. The preselected color may be chosen for aesthetic reasons, to indicate ownership by "branding" the area enclosed by the fencing, or to make a length of fencing more visible.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various features, elements, functions and/or properties disclosed herein. No single feature, function, element or property of the disclosed embodiments is essential to all embodiments. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are different, broader, narrower or equal in scope to the original claims, are also regarded as included within the subject matter of the invention.

I claim:

1. A method of reinforcing a length of fencing having a pair of supports, fence boundary material extending between the supports, and a plurality of wire lengths that extend between a first bracing location on one of the supports and a second bracing location on the other support, the wire lengths being adjacent and generally parallel to the fence boundary material, the wire lengths defining an axis generally parallel to their lengths, the method comprising:

providing a tightening tool with a body having an outer surface with generally opposed sides and generally opposed ends, the body being adapted for insertion between respective ones of the plurality of wire lengths, wherein the outer surface of the body includes at least one seating portion adapted to retain the wire lengths generally between the opposed ends of the body, wherein the body has a passage defined between the ends of the body, and further wherein the passage is adapted to receive a lever to facilitate rotation of the body about the axis;

inserting the body between respective ones of the plurality of wire lengths so that at least one of the plurality of wire lengths passes around each side of the outer surface of the body, and so that the body extends between its opposed ends in a direction generally transverse to the axis; and rotating the body about the axis to twist the wire lengths around one another and thereby exert a contracting force on the supports until a desired tension is achieved, wherein the step of rotating the body comprises:

providing a lever dimensioned so that it can slide through the passage defined through the body;

inserting the lever at least partially through the passage;

applying a rotating force to the lever to rotate the lever and tool body about the axis until the fence boundary material blocks the lever and thereby prevents further rotation of the lever and body;

sliding the lever through the passage so that the fence boundary material no longer blocks the lever; and applying a further rotating force to the lever to further rotate the lever and tool body about the axis.

2. The method of claim 1, wherein the seating portion includes at least one notch extending inward from the outer surface of the body.

3. The method of claim 2, wherein the outer surface of the body has a pair of adjacent sides that define a corner, and wherein the notch is formed at the corner.

4. The method of claim 2, wherein the notch extends along at least a portion of at least one of the sides.

5. The method of claim 4, wherein the notch extends around at least a substantial portion of the outer surface of the body.

6. The method of claim 5, wherein the notch extends completely around the outer surface of the body.

7. The method of claim 1, wherein the seating portion includes a plurality of notches extending inward from the outer surface of the body.

8. The method of claim 1, wherein the body has a generally rectangular cross-sectional configuration.

9. The method of claim 1, wherein the body has a generally circular cross-sectional configuration.

10. The method of claim 1, wherein the seating portion includes a pair of projections extending outward from the outer surface of the body, the projections defining a wire receiving region therebetween.

11. The method of claim 10, wherein the projections extend along at least a portion of one of the sides.

12. The method of claim 10, wherein the projections extend around at least a substantial portion of the outer surface of the body.

13. The method of claim 11, wherein the projections extend completely around the outer surface of the body.

* * * * *